United States Patent Office 3,424,793
Patented Jan. 28, 1969

3,424,793
PREPARATION OF TRIMETHYL CHLORO-SUBSTITUTED LOWER ALKYL QUATERNARY AMMONIUM SALTS
Jacek Kokosinski, Ul. Lewartowskiego 9, m. 4; Jan Orlowski, Ul. Sielecka 59, m. 1; Barbara Czachowska, Al. Niepodleglosci 245, m. 42; and Boleslaw Hancyk, Al. Wojska Polskiego 40, m. 15, all of Warsaw, Poland
No Drawing. Filed July 11, 1966, Ser. No. 564,032
Claims priority, application Poland, July 14, 1965, P 110,003
U.S. Cl. 260—567.6    5 Claims
Int. Cl. C07c 85/04

ABSTRACT OF THE DISCLOSURE

A process for producing ammonium salts of trimethylamine of the formula $(CH_3)_3NRX$, wherein R is a lower alkyl, aryl, alkenyl, alkynyl or cycloalkyl radical or one of said radicals substituted by a halogen atom and wherein X is a halogen by reacting in the liquid phase an excess of a compound of the formula RX wherein R and X are as defined above with trimethylamine at a temperature of at least 70° C.

---

This invention relates to a process for the preparation of ammonium salts of the general formula

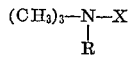

wherein R is selected from the group consisting of lower alkyl, aryl, alkenyl, alkynyl, cycloalkyl radicals and said radicals being halosubstituted; and wherein X is a halogen.

The known industrial methods for the synthesis of ammonium salts of the type $(CH_3)_3NRX$ have always presented a number of disadvantages. These methods are based on amino-alcohols or their chlorides as the basic raw material. The compounds are obtained by the action of thionyl chloride or other chloridizing agents upon amino chlorides in benzene solution. The separation of the final products from the reaction mixture is in most cases very difficult. The products are purified by crystallization from organic solvents, and the yields obtained by these methods amount to about 80%.

Another method for obtaining these compounds consists in the reaction of tertiary amines and halogen hydrocarbons conducted under normal pressure, i.e. at a temperature not exceeding the boiling point of the halogen hydrocarbon used.

The latter method has found very limited application in industry because of the low reaction rate and inefficiency. Theoretically, the most convenient process for the synthesis of the above-mentioned compounds by the addition of a suitable halogen hydrocarbon to trimethylamine has not found reasonable solution.

The process according to the present invention enables the preparation of ammonium salt of the formula:

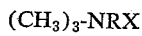

by adding trimethylamine to compounds of the formula RX wherein R and X are as defined above, at a high, nearly theoretical rate of production in a relatively short reaction time.

Apart from other advantages, the process according to this invention also insures full work safety providing complete protection from toxicity, explosion danger, and maintaining of normal working conditions for personnel in spite of the characteristic unpleasant amine odor.

In the instant process, the reaction between trimethylamine and the halogen hydrocarbon occurs in the liquid phase, in a medium of the halogen hydrocarbon used in a considerable stoichiometric excess (over 100%) relative to trimethylamine. The pressure at which the reaction is effected corresponds to the vapor pressure of trimethylamine at the reaction temperature, or at a slightly lower pressure. The reaction must be conducted at a temperature not lower than the boiling point of the halogen hydrocarbon at atmospheric pressure.

Preferably, the process is conducted at a temperature above 70° C. and a pressure exceeding 5 kg./sq. cm. In addition, it is preferred that the molar ratio of halogen hydrocarbon to trimethylamine be at least 2.5:1.

The method according to this invention can be effected in an autoclave using a single charge of both raw materials, or feeding trimethylamine in the form of liquid or vapor. The circulation of trimethylamine, or a continuous process can be also used.

Using this method, a reaction mixture is obtained which is in the form of a pulp or suspension from which the pure ammonium salt is separated by filtering and drying. The residue which is unreacted halogen hydrocarbon, can be used for a subsequent synthesis.

Example 1

Trimethylamine vaporized at a temperature of 100° C. is transferred from a pressure tank to a steel autoclave provided with a stirrer, pressure gauge and thermometer. The autoclave contains 500 kg. of 1,2-dichloroethane heated to a temperature of 85° C.

The inflow of trimethylamine is cut off when the pressure in the autoclave reaches the value of 8 kg./sq. cm. The contents of the autoclave are stirred vigorously and the pressure allowed to drop to 5 kg./sq. cm. Trimethylamine is again fed to the autoclave and the operation repeated until 100 kg. of raw material has been supplied. The autoclave is kept for 8 hours at a constant temperature, then cooled down to about 30° C. and the contents filtered by means of a vacuum filter. After drying at a temperature of 105° C., the weight of the residue from the vacuum filter amounts to 250 kg. This is pure 2-chloroethyltrimethylamine chloride. The unreacted 1,2-dichloroethane slightly contaminated with trimethylamine can be used as the raw material in a succeeding production charge.

Example 2

Trimethylamine vaporized at a temperature of 125° C. is transferred from a pressure tank to a steel autoclave provided with a stirrer, pressure gauge and thermometer. The autoclave contains 650 kg. of 1,2-dichloro-2-methylpropane heated to a temperature of 110° C.

The inflow of trimethylamine is cut off when the pressure in the autoclave reaches 20 kg./sq. cm. The contents of the autoclave are stirred vigorously and the pressure allowed to drop to 5 kg./sq. cm. Trimethylamine is again fed to the autoclave and the operation repeated until 100 kg. of raw material has been supplied. The autoclave is kept at a constant temperature for 10 hours, then cooled down to about 30° C. and the contents filtered by means of a vacuum filter. After drying, the weight of the residue from the vacuum filter amounts to 300 kg. This is pure 2-chloro-2-methyl propyl trimethylamine chloride. The unreacted 1,2-dichloro-2-methylpropane slightly contaminated with trimethylamine can be used as the raw material in a succeeding production charge.

Example 3

Trimethylamine vaporized at a temperature of 100° C. is transferred from a pressure tank to a steel autoclave provided with a stirrer, pressure gauge and thermometer. The autoclave contains 850 kg. of 1,1,2,2-tetrachloroethane heated to a temperature of 85° C.

The inflow of trimethylamine is cut off when the pressure in the autoclave reaches 8 kg./sq. cm. The contents of the autoclave are stirred vigorously and the pressure allowed to drop to 5 kg./sq. cm. Trimethylamine is again fed to the autoclave and the operation repeated until 100 kg. of raw material has been supplied. The autoclave is kept at a constant temperature for 8 hours, then cooled down to about 30° C. and the contents filtered by means of a vacuum filter. After drying at a temperature of 105° C., the weight of the residue from the vacuum filter amounts to 360 kg. This is 1,2,2-trichloroethyltrimethylamine chloride. The unreacted 1,1,2,2-tetrachloroethane slightly contaminated with trimethylamine can be used as the raw material in a succeeding production charge.

What is claimed is:

1. A process for the preparation of ammonium salts of trimethylamine of the formula

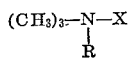

wherein R is selected from the class consisting of lower alkyl groups substituted by at least one chlorine atom; and X is chlorine, said process comprising reacting trimethylamine and a compound of the formula

RX wherein R and X are as defined above in liquid phase at a temperature of at least the boiling point of said compound and a pressure of at most the vapor pressure of trimethylamine at the reaction temperature, said compound being present in a molar ratio of more than 2:1 with respect to the trimethylamine, the excess of said compound over the stoichiometric amount being the reaction medium.

2. A process according to claim 1 wherein R is 2-chloroethyl, 2-chloro-2-methylpropyl or 1,2,2-trichloroethyl.

3. A process according to claim 2 wherein reacting is effected at a temperature of at least 70° C. and a pressure of at least 5 kg./sq. cm.

4. A process according to claim 2 wherein said compound and trimethylamine are present in a molar ratio of at least 2.5:1

5. A process according to claim 1 wherein a reaction mixture consisting essentially of the ammonium salt of trimethylamine and an unreacted portion of said compound is formed, said process further comprising separating the reaction mixture into the ammonium salt of trimethylamine and the unreacted portion of said compound and utilizing said unreacted portion of said compound as starting material in a subsequent cycle of the process.

References Cited
UNITED STATES PATENTS 1,797,877  3/1931  Moore _____ 260—567.6

CHARLES B. PARKER, *Primary Examiner.*

S. T. LAWRENCE III, *Assistant Examiner.*